United States Patent
Grier et al.

(10) Patent No.: US 7,328,144 B1
(45) Date of Patent: Feb. 5, 2008

(54) SYSTEM AND METHOD FOR SIMULATING A SOFTWARE PROTOCOL STACK USING AN EMULATED PROTOCOL OVER AN EMULATED NETWORK

(75) Inventors: James R. Grier, Groton, MA (US); Scott Schoenthal, San Ramon, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 671 days.

(21) Appl. No.: 10/833,809

(22) Filed: Apr. 28, 2004

(51) Int. Cl.
G06F 9/45 (2006.01)
G06F 3/00 (2006.01)
G06F 15/16 (2006.01)
G06F 9/44 (2006.01)
G06F 9/46 (2006.01)
G06F 13/00 (2006.01)

(52) U.S. Cl. .................... 703/22; 710/11; 709/230; 719/321; 719/328

(58) Field of Classification Search ............... 703/22; 710/11; 709/230; 719/321, 328
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,633,999 A | 5/1997 | Clowes et al. | |
| 5,781,770 A | 7/1998 | Byers et al. | |
| 5,812,748 A | 9/1998 | Ohran et al. | |
| 5,812,751 A | 9/1998 | Ekrot et al. | |
| 5,951,695 A | 9/1999 | Kolovson | |
| 6,119,244 A | 9/2000 | Schoenthal et al. | |
| 6,292,905 B1 | 9/2001 | Wallach et al. | |
| 6,434,620 B1* | 8/2002 | Boucher et al. | 709/230 |
| 6,625,749 B1 | 9/2003 | Quach | |
| 6,728,897 B1 | 4/2004 | Cramer et al. | |
| 2001/0034751 A1* | 10/2001 | Eto et al. | 709/100 |

OTHER PUBLICATIONS

Jiuxing Liu, Jiesheng Wu, Sushmitha P. Lini, Pete Wyckoff and Dhabaleswar K. Panda, "High Performance RDMA-Based MPI Implementation over InfiniBand", ACM 1-58113-733-8/03/0006, Jun. 23-26, 2003, pp. 295-304.*

* cited by examiner

Primary Examiner—Paul Rodriguez
Assistant Examiner—Dwin McTaggart Craig
(74) Attorney, Agent, or Firm—Cesari and McKenna, LLP

(57) ABSTRACT

A system and method for simulating a software protocol stack over an emulated network using an emulated protocol. A storage operating system simulator, executing on a host computer, includes an interconnect communication stack that utilizes an emulated protocol over an emulated network to communicate with another storage operating system simulator configured in a cluster configuration.

25 Claims, 7 Drawing Sheets

SYSTEM AND METHOD FOR SIMULATING A SOFTWARE PROTOCOL STACK USING AN EMULATED PROTOCOL OVER AN EMULATED NETWORK

RELATED APPLICATION

This application is related to U.S. patent application Ser. No. 10/833,405 entitled SYSTEM AND METHOD FOR PROVIDING REMOTE DIRECT MEMORY ACCESS OVER A TRANSPORT MEDIUM THAT DOES NOT NATIVELY SUPPORT REMOTE DIRECT MEMORY ACCESS OPERATIONS, by James Grier, et al., the contents of which are hereby incorporated by reference.

FIELD OF THE INVENTION

The present invention relates to simulating a protocol stack and, in particular, to simulating a software protocol stack using an emulated protocol over an emulated network.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission. Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

It is advantageous for the services and data provided by a storage system to be available for access to the greatest degree possible. Accordingly, some computer systems provide a plurality of storage systems organized as nodes of a cluster, with a property that when a first storage system fails, a second storage system is available to take over and provide the services and the data otherwise served by the first storage system. In particular, when the first storage system fails, the second storage system in the cluster assumes the tasks of processing and handling any data access requests normally processed by the first storage system. One such example of a cluster configuration is described in U.S. patent application Ser. No. 09/625,234 entitled NEGOTIATING TAKEOVER IN HIGH AVAILABILITY CLUSTER by Samuel M. Cramer, et al.

In a typical cluster environment, the various storage systems are interconnected by one or more cluster interconnects that are typically implemented using Virtual Interface (VI) layered on Fibre Channel (FC-VI) over a physical FC transport medium. Virtual Interfaces are further described in Virtual Interface Architecture Specification, Version 1.0 by Compaq Computer Corp. et al., the contents of which are hereby incorporated by reference. A cluster interconnect is illustratively a direct network connection linking two or more storage systems in a cluster environment. The storage systems utilize the VI-protocol, including its native remote direct access (RDMA) capabilities, during normal cluster operation over the cluster interconnect. By "native" it is meant that the transport protocol, e.g., FC-VI, supports the desired functionality, e.g. RDMA, without modifications.

Executing on each of the various storage systems typically is a storage operating system that manages the storage systems and may implement file system semantics. The storage operating system must be robust to prevent data loss from error conditions arising while executing on a storage system. As such, during development, the storage operating system must be thoroughly tested before being released for use in actual data serving environments. One method for performing such a test during development is to simulate the storage operating system on a host computer that is executing its own operating system. This storage operating system simulator entails portions of the storage operating system executing as a user-level application on the host computer. In this testing environment, disks associated with a storage system are typically represented by files on the host computer's file system. Thus, write operations from a disk driver module of the storage operating system are converted to file-level operations by the host's operating system. Similarly, network protocol communications, such as by TCP/IP, are passed from the storage operating system to the host computer's operating system for processing.

A noted disadvantage of such a testing configuration is that the protocol stack of the simulated storage operating system is not tested as the processes of the stack are "offloaded" to the host computer's operating system. To simulate a clustering environment, two separate instantiations of the simulated storage operating system may be executed as separate processes on the host computer. However, in such configurations, the cluster interconnect adapter is typically represented by a shared memory segment that is used as a mailbox between the two simulated storage operating systems. Unfortunately, this high-level of abstraction eliminates the protocol software stack that drives the cluster interconnect. Thus, this interconnect communication protocol stack can only be tested and/or debugged on a live storage system cluster, which eliminates the cost savings and control of testing on a storage operating system simulator.

SUMMARY OF THE INVENTION

The disadvantages of the prior art are overcome by providing a system and method for simulating a software protocol stack using an emulated protocol over an emulated network. Two instantiations of a storage operating system simulator execute on a host computer to simulate a cluster environment. The storage operating system simulator includes portions of a storage operating system, such as a media access layer of network drivers, as well as other layers of an interconnect communications stack. According to the invention, the storage operating system simulator is modified by utilizing an emulated VI protocol adapter (MVIA) module that provides a plugable communication architecture between the instantiations of the simulator. The plugable communication architecture is configured to operate with a plurality of interprocess data pathway mechanisms to thereby emulate a network connection such as a cluster interconnect over Ethernet, or any other transport medium that is supported by a MVIA module. In a first embodiment, the interprocess data pathway mechanisms are ring buffers of a shared memory region associated with the media access drivers of the storage operating system's communication stack. In a second embodiment, the communication mechanism is a socket pair between the two simulator processes by the media access layers of the respective simulator instantiations.

The present invention permits the debugging and testing of the entire storage operating system protocol software stack devoted to the cluster interconnect including the MVIA module itself, within a simulated environment. The storage operating system simulator offers the advantage of executing on less expensive hardware than actual storage appliances. Additionally, use of a simulator for debugging and/or testing purposes provides greater control over the simulator environment.

BRIEF DESCRIPTION OF THE DRAWINGS

The above and further advantages of the invention may be understood by referring to the following description in conjunction with the accompanying drawings in which like reference numerals indicate identical or functionally similar elements.

DETAILED DESCRIPTION OF ILLUSTRATIVE EMBODIMENTS

A. Cluster Environment

Figure 1:
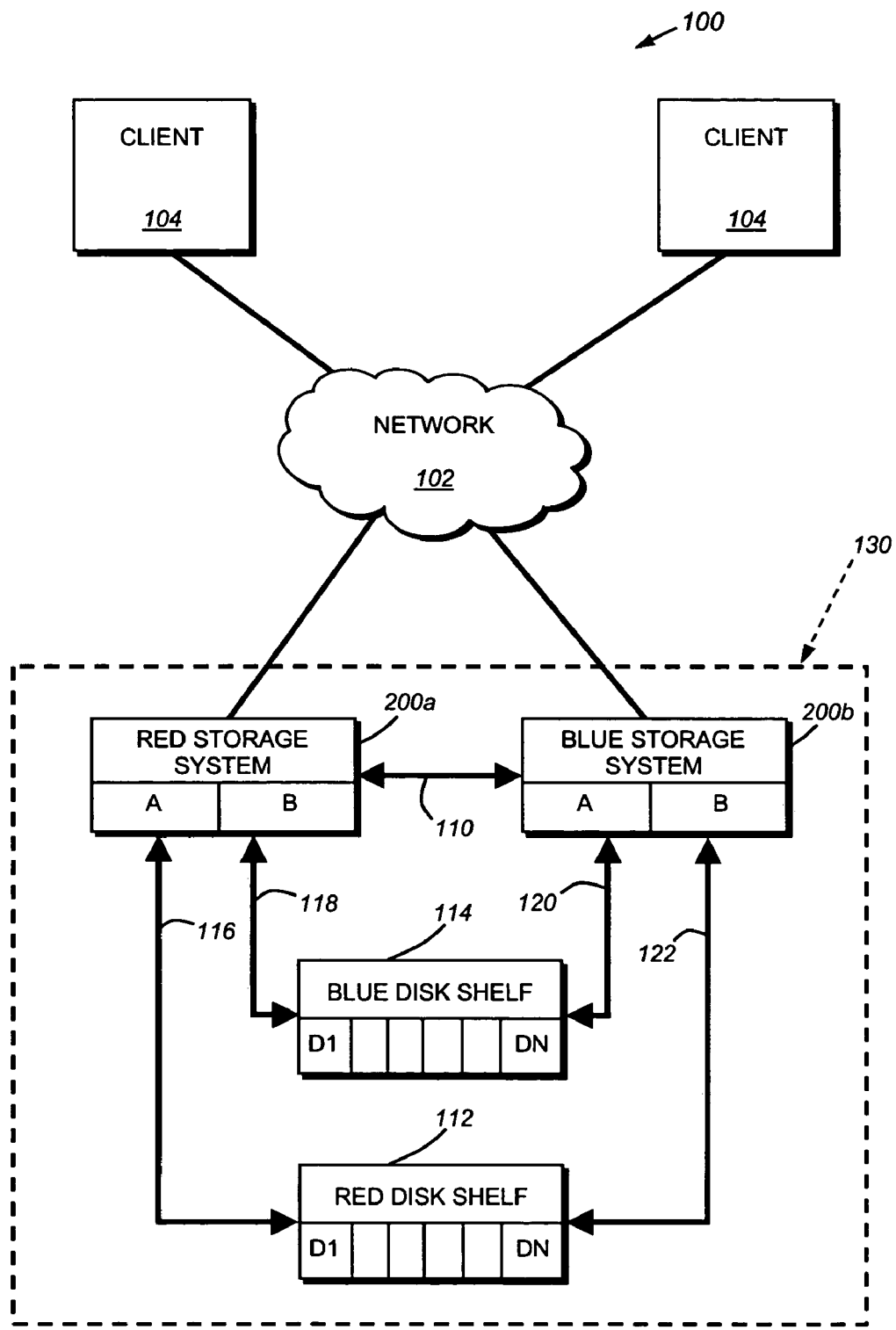
FIG. 1 is a schematic block diagram of an exemplary network environment having storage systems in a storage system cluster in accordance with an embodiment of the present invention.

FIG. 1 is a schematic block diagram of an exemplary network environment 100 in which the principles of the present invention may be implemented. A network 102 may comprise point-to-point links, wide area networks (WAN), virtual private networks (VPN) implemented over a public network (Internet), a shared local area network (LAN) and/or any other acceptable networking architecture. The network may comprise a FC switching network or a TCP/IP network. In alternate embodiments there may exist multiple networks 102 including, e.g., FC switching networks and/or TCP/IP networks. Attached to the network 102 are clients 104 and various storage systems, such as Red storage system 200*a* and Blue storage system 200*b*.

A client 104 may be a general-purpose computer, e.g., a PC, a workstation or a special-purpose computer, e.g., an application server, configured to execute applications over a variety of operating systems, including the UNIX® and Microsoft® Windows™ operating systems that support block access protocols. Red storage system 200*a* and Blue storage system 200*b* are connected as two nodes of an exemplary storage system cluster 130. These storage systems, described further below, are illustratively storage appliances configured to control storage of and access to interconnected storage devices. Each system attached to the network cloud 102 includes an appropriate conventional network interface arrangement (not shown) for communicating over the network 102 or through the switches 106 and 108.

In the illustrated example, Red storage system is connected to Red Disk Shelf 112 by data access loop 116 (i.e., Red Disk Shelf's A port). It should be noted that such a data access loop can be any acceptable networking media including, for example, a Fibre Channel Arbitrated Loop (FC-AL). Similarly, the Red storage system accesses Blue Disk Shelf 114 via counterpart data access loop 118 (i.e., Blue Disk Shelf's B port). Likewise, Blue storage system accesses Blue Disk Shelf 114 via data access loop 120 (i.e., Blue Disk Shelf's A port) and Red Disk Shelf 112 through counterpart data access loop 122 (i.e., Red Disk Shelf's B port). It should be further noted that the Red and Blue disk shelves are shown directly connected to storage systems 200 for illustrative purposes only. That is, the disk shelves and storage systems may be operatively interconnected via any suitable FC switching network topology. During normal cluster operation, the storage system that is connected to a disk shelf via the disk shelf's A loop is the "owner" of the disk shelf and is primarily responsible for servicing requests directed to blocks on volumes contained on that disk shelf. Thus, the Red storage system owns Red Disk Shelf 112 and is primarily responsible for servicing data access requests for data contained on that disk shelf. Similarly, the Blue storage system is primarily responsible for the Blue disk shelf 114. When operating as a cluster, each storage system is configured to take over and assume data handling capabilities for the other disk shelf in the cluster 130 via the disk shelf's B port.

Connecting the Red and Blue storage systems is a cluster interconnect 110, which provides a direct communication link between the two storage systems. Additionally, in alternate embodiments, multiple cluster interconnects may link the storage systems of a storage system cluster. In accordance with the illustrative embodiment of the present invention, one or more of the cluster interconnects comprises a transport medium that does not natively support RDMA operations, such as, for example, an Ethernet connection.

B. Storage Appliance

Figure 2:
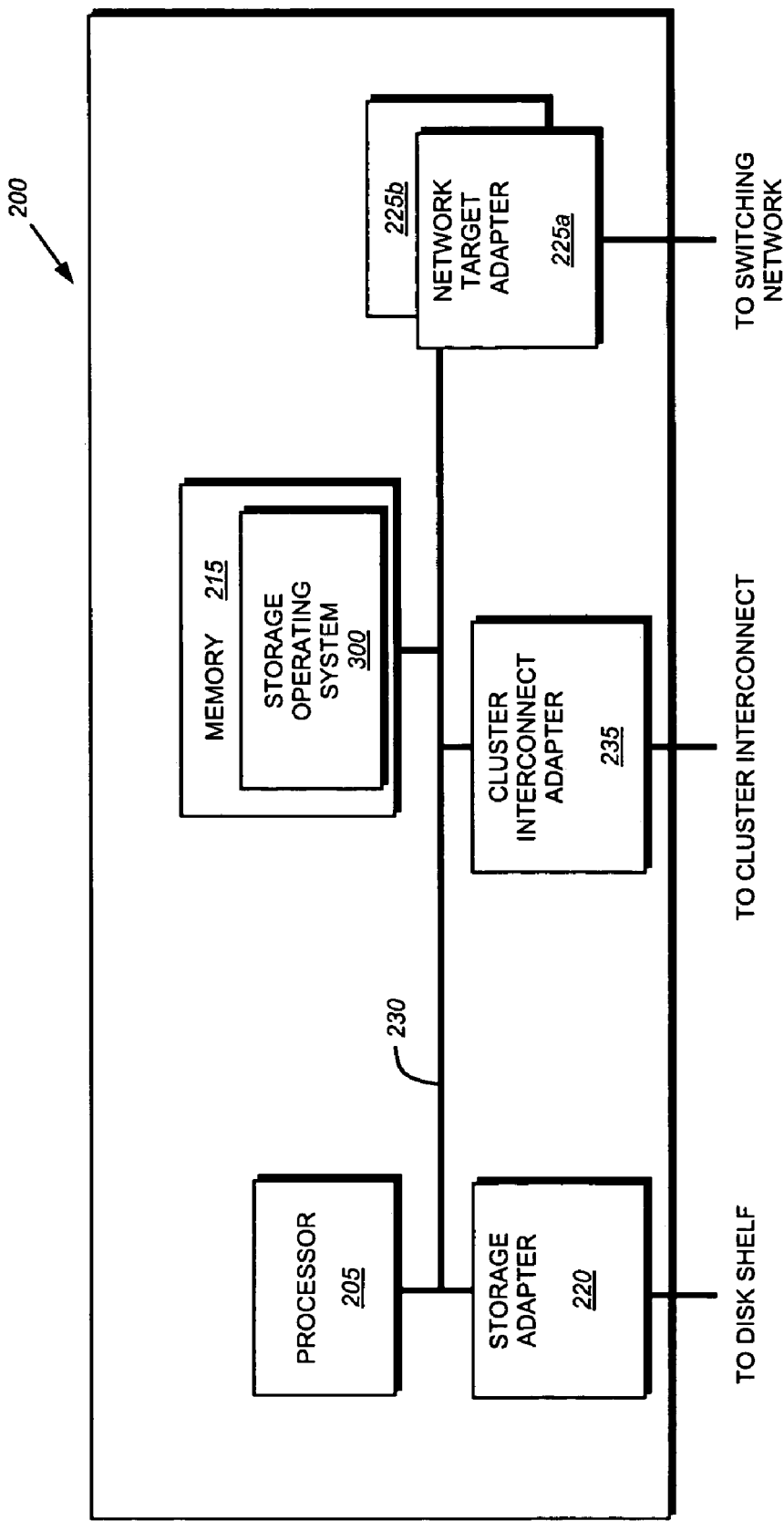
FIG. 2 is a schematic block diagram of an exemplary storage system in accordance with an embodiment of the present invention.

FIG. 2 is a schematic block diagram of an exemplary storage system 200 used in the cluster network environment 100 and configured to provide storage service relating to the organization of information on storage devices, such as disks. The storage system 200 is illustratively embodied as a storage appliance comprising one or more processors 205, a memory 215, a plurality of network adapters 225a, 225b and a storage adapter 220 interconnected by a system bus 230. The terms "storage system" and "storage appliance" are used interchangeably herein. The storage appliance 200 also includes a storage operating system 300 that logically organizes the information as a hierarchical structure of directories, files and virtual disks (vdisks) on the disks.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

Each network adapter 225a, b may comprise a network interface card (NIC) having the mechanical, electrical, and signaling circuitry needed to couple the storage appliance to the switch 106, 108. Each NIC may include an interface that is assigned one or more IP addresses along with one or more media access control (MAC) addresses. The clients 104 communicate with the storage appliance by sending packet requests for information to these addresses in accordance with a predefined protocol, such as TCP/IP.

The storage adapter 220 cooperates with the storage operating system 300 executing on the storage appliance to access information requested by the clients 104. The information may be stored on the disks or other similar media adapted to store information. The storage adapter includes input/output (I/O) interface circuitry that couples to the disks over an I/O interconnect arrangement, such as a conventional high-performance, FC serial link or loop topology. The information is retrieved by the storage adapter and, if necessary, processed by the processors 205 (or the adapter 220 itself) prior to being forwarded over the system bus 230 to the network adapters 225a and b, where the information is formatted into packets and returned to the clients.

Storage of information on the storage appliance 200 is, in the illustrative embodiment, implemented as one or more storage volumes that comprise a cluster of physical storage disks, defining an overall logical arrangement of disk space. The disks within a volume are typically operated as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that logically organizes the information as a hierarchical structure of directory, file and vdisk objects (hereinafter "directories", "files" and "vdisks") on the disks. A vdisk is a special file type that is translated into an emulated disk or logical unit number (lun) as viewed by a storage area network (SAN) client. Each "on-disk" file may be implemented as set of disk blocks configured to store information, such as data, whereas the directory may be implemented as a specially formatted file in which names and links to other files and directories are stored.

The storage appliance also includes a cluster interconnect adapter 235 that provides a specific network interface to a cluster partner of the storage system for various partner-to-partner communications and applications. The cluster interconnect adapter 235 is illustratively an Ethernet network interface. In alternate embodiments, the cluster interconnect adapter may utilize another transport medium that does not natively support RDMA operations, such as FC without being layered with FC-VI or FCP. In the example of a cluster interconnect utilizing FCP, the SCSI transport protocol supports semantics for high-speed zero-copy bulk data transfer but does not natively support RDMA semantics.

C. Storage Operating System

In the illustrative embodiment, the storage operating system is the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term ONTAP is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
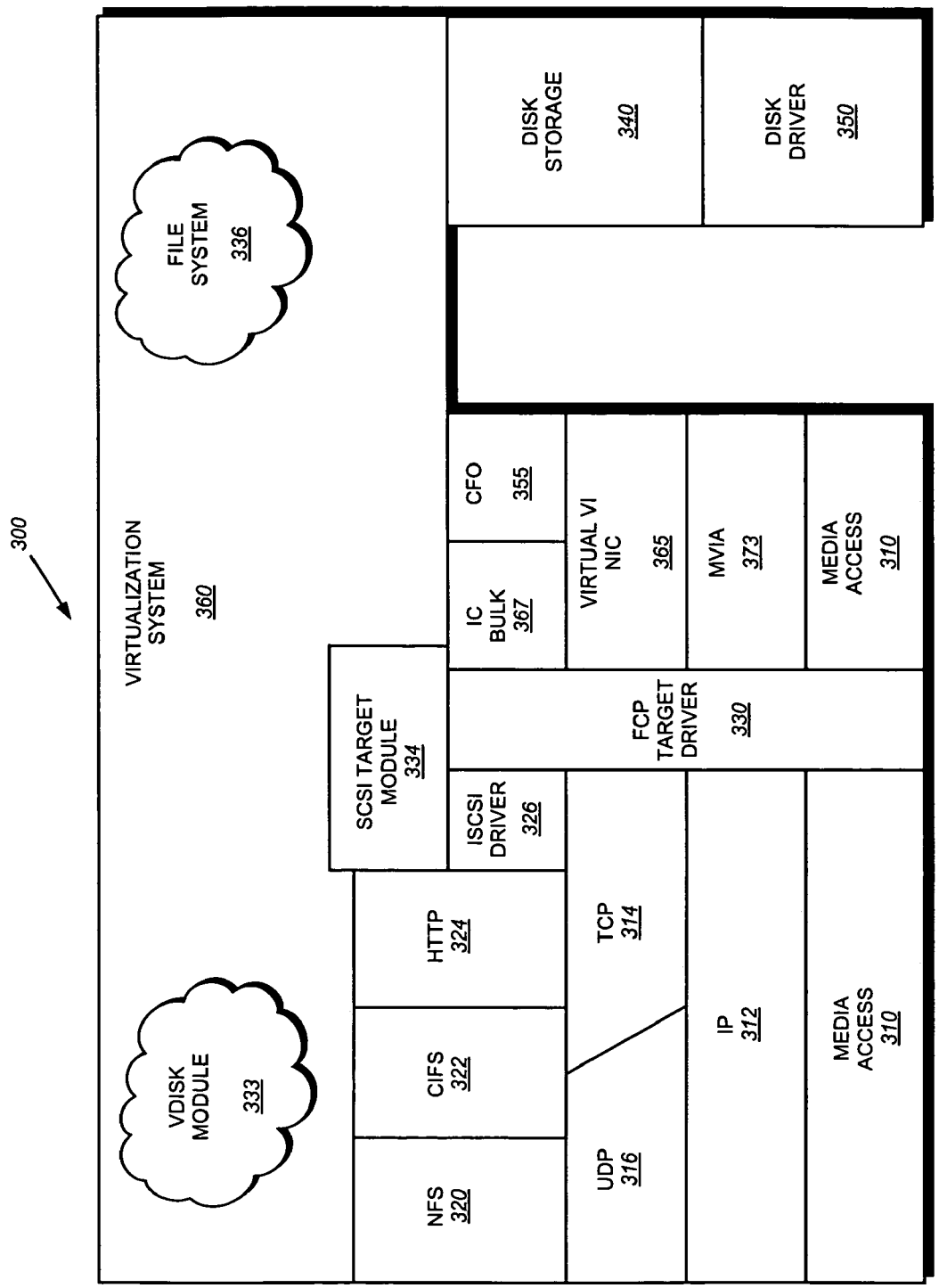
FIG. 3 is a schematic block diagram of an exemplary storage operating system executing on a storage system for use in accordance with an embodiment of the present invention.

FIG. 3 is a schematic block diagram of a storage operating system 300 that implements the present invention. The storage operating system comprises a series of software layers organized to form an integrated network protocol stack or, more generally, a multi-protocol engine that provides data paths for clients to access information stored on the storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the NFS protocol 320, the CIFS protocol 322 and the Hypertext Transfer Protocol (HTTP) protocol 324.

An iSCSI driver layer 328 provides block protocol access over the TCP/IP network protocol layers, while a FCP target driver layer 330 operates with an FC HBA to receive and transmit block access requests and responses to and from the integrated storage appliance. The FCP and iSCSI target drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. FCP and iSCSI are examples of SCSI transports that include support for zero copy bulk data transfers. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization modules illustratively embodied as, e.g., vdisk module 333 and SCSI target module 334. It should be noted that the vdisk module 333, the file system and SCSI target module 334 can be implemented in software, hardware, firmware, or a combination thereof. The vdisk module 333 interacts with the file system 336 to enable access by administrative interfaces in response to a system administrator issuing commands to the multi-protocol storage appliance 200. In essence, the vdisk module 333 manages SAN deployments by, among other things, implementing a comprehensive set of vdisk (lun) commands issued through a user interface by a system administrator. These vdisk commands are converted to primitive file system operations ("primitives") that interact with the file system 333 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks.

The file system 336 is illustratively a message-based system; as such, the SCSI target module 334 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 334 passes the message into the file system 336 as, e.g., a function call, where the operation is performed.

The file system 335 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., the contents of which are hereby incorporated by reference.

The storage operating system 300 also includes an interconnect communication stack that comprises an interconnect bulk module 367, a virtual VI NIC 365, and an eMulated Virtual Interface Adapter (MVIA) module 373. The interconnect bulk module 367 provides flow control over the cluster interconnect 110. The virtual VI NIC 365 provides a software interface between upper level module of the storage operating system and the lower-level modules of the interconnect protocol stack, i.e. the virtual VI NIC 365 functions as an adapter driver to the interconnect protocol stack and specifically the MVIA module. The virtual VI NIC may include support for any RDMA or Direct Access Transport (DAT) API. Thus, in alternate embodiments, the virtual VI NIC may be replaced with, or supplemented with, other API modules such as a VI Provider Library (VIPL) or Direct Access Provider Library (DAPL). As such, the virtual VI NIC, VIPL or DAPL module may be generalized as an RDMA API module that implements semantics for a RDMA compatible protocol, such as FC-VI or InfiniBand.

The MVIA module, described further below, illustratively implements a modified M-VIA package that emulates RDMA semantics onto a protocol that lacks such semantics. The M-VIA (Modular VI Architecture) package is available from The National Energy Research of Scientific Computing Center at the Lawrence Berkeley Labs. While this description is written in terms of a modified MVIA package, it is expressly contemplated that other emulated protocols and/or systems may be utilized in accordance with the principles of the present invention. As such, the term "MVIA module" should be taken to mean any module implementing an RDMA capable protocol over a transport medium that does not natively support RDMA operations according to the teachings of the present invention.

E. Emulated VI Protocol

The VI protocol is described in the above-incorporated Virtual Interface Architecture Specification Version 1.0. The MVIA module of the operating system implements a modified version of the MVIA package as distributed by NERSC. The illustrative MVIA module protocol, which comprises the actual packets of data transmitted over the physical cluster interconnect transport medium, comprises three types of messages: data messages, control messages and acknowledgement (ACK) messages. The MVIA module protocol described herein should be taken as exemplary only.

Figure 4:
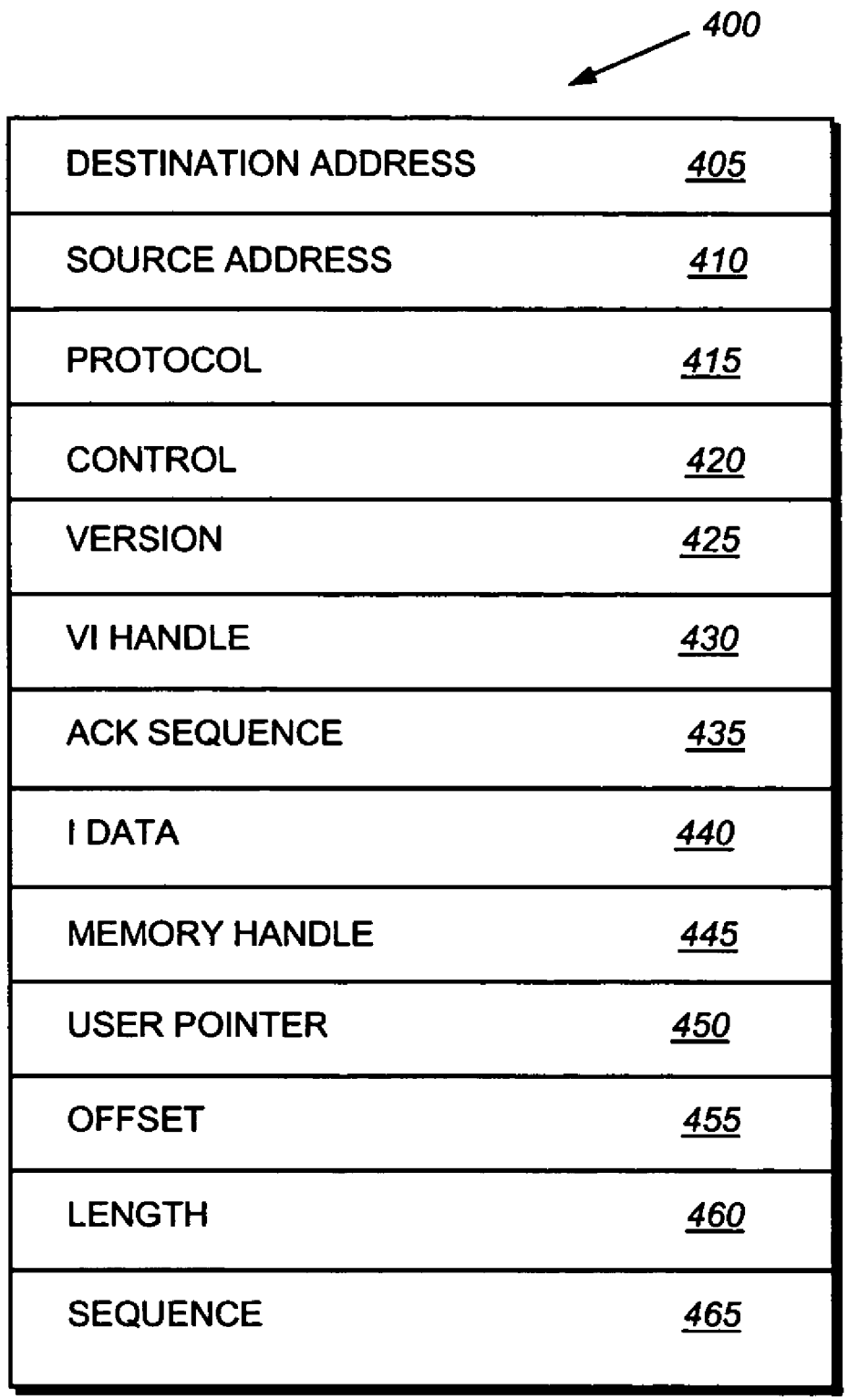
FIG. 4 is a schematic block diagram of an MVIA protocol data packet in accordance with an embodiment of the present inventions.

FIG. 4 is a schematic block diagram of an exemplary MVIA module protocol data packet 400. The data packet 400 includes a destination address field 405, a source address field 410, a protocol field 415, a control field 420, a version field 425, a VI handle field 430, and acknowledgement (ACK) sequence field 435 and idata field 440, a memory handle field 445, a user pointer field 450, an offset field 455, a length field 460 and a sequence field 465. In alternate embodiment, the data packet 400 may include additional fields and/or differing fields. It should be noted that the destination address field 405, source address field 410 and protocol field 415 exactly overlay those fields of a conventional Ethernet header. The destination address field 405 includes an Ethernet address of the intended destination of the data packet 400. The source address field 410 includes the Ethernet address of the source of the packet. The protocol field 415, which corresponds to the ether_type field in a conventional Ethernet packet, is expanded to include a new protocol value (VIPK_ERING PROTOCOL), which defines the packet as an emulated VI packet.

The control field 420 identifies the type of packet by including one of three conventional values, namely SENDRECV, RDMAWRITE or RDMAREAD. The RDMAWRITE value identifies the data packet as an RDMA write operation. Similarly, the RDMAREAD value identifies the packet as an RDMA read operation. The SENDRECV value identifies the packet as a conventional, non-RDMA, operation. The control field may have additional bits set to identify that the data packet is the last fragment of data (LAST_FRAG) or the first fragment of a set of data (FIRST_FRAG). The LAST_FRAG and FIRST_FRAG values may be utilized when, for example, data is sent in multiple packets to signify the beginning and end of the data.

The version field 425 identifies the current version of the MVIA module, while the VI handle field 430 identifies the appropriate VI handle, defined by the VI specification, associated with this operation. The ACK sequence field 435 contains a value that indicates which message associated with the VI handle is to be acknowledged. The idata field 440 holds data being transferred via a non-RDMA operation. The memory handle field 445 and user pointer field 450 are utilized during RDMA operations to identify memory in the destination. The offset field 455 identifies an offset within the memory identified by the memory handle field 445. Similarly, the length field 460 identifies the length of the RDMA operation to be performed. The sequence field 465 includes a value for use in acknowledging receipt of the packet.

Figure 5:
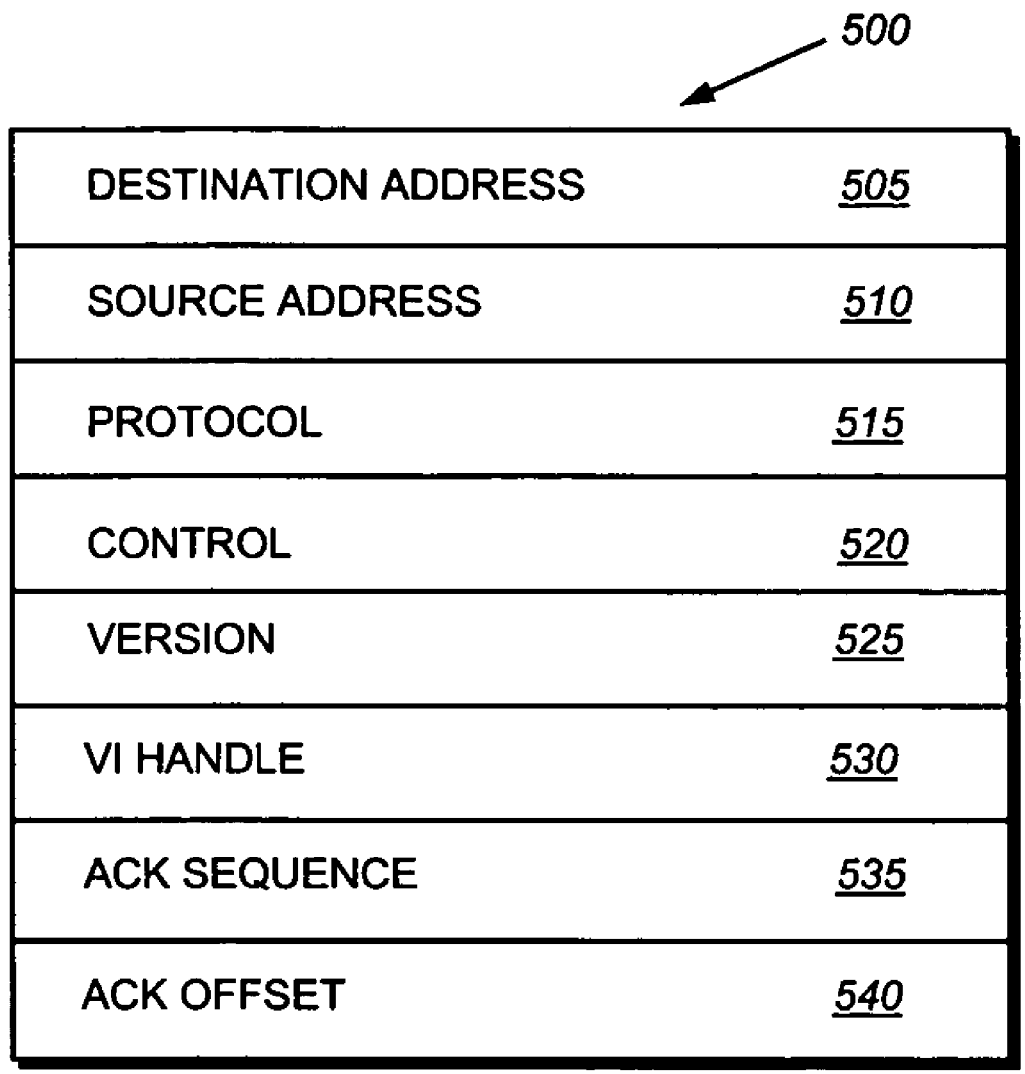
FIG. 5 is a schematic block diagram of a MVIA acknowledgement packet in accordance with an embodiment of the present invention.

FIG. 5 is a schematic block diagram of an exemplary acknowledgment (ACK) packet 500 in accordance with the embodiment of the present invention. The ACK packet 500 includes a destination address field 505, a source address field 510, a protocol field 515, a control field 520, a version field 525, a VI handle field 530, and an ACK sequence field 535 and an acknowledgement (ACK) offset field 540. The destination address, source address and protocol fields 505, 510, and 515 are identical to their respective counterparts in the data packet 400, described in detail above. The control field 520 includes several options that may be set including, an ACK option identifying the packet as an acknowledgment packet along with a not acknowledged (NACK) value and GACK value. If the ACK value is set in the control field 520, the packet is identified as an acknowledgment packet. If a NACK option is also set within the control field 520, the packet is identified as a not acknowledged packet and should be resent according to VI protocol. If the GACK value is set within the control field, the acknowledgment packet is identified as a kill packet, and the recipient storage appliance should perform the appropriate processing, as described above. The version field 525, VI handle field 530 and acknowledged sequence field 535 are identical to the similarly named fields discussed above in reference to the data packet 400. The ACK sequence field 535 is utilized to identify which data packet is being acknowledged by including the appropriate ACK sequence value from the appropriate data packet. The ACK offset field 540 identifies the number of bytes received. Thus, an acknowledgment packet may, by setting the acknowledgement offset field to an appropriate value, signify that a specific number of bytes was received and is being acknowledged by the packet.

Figure 6:
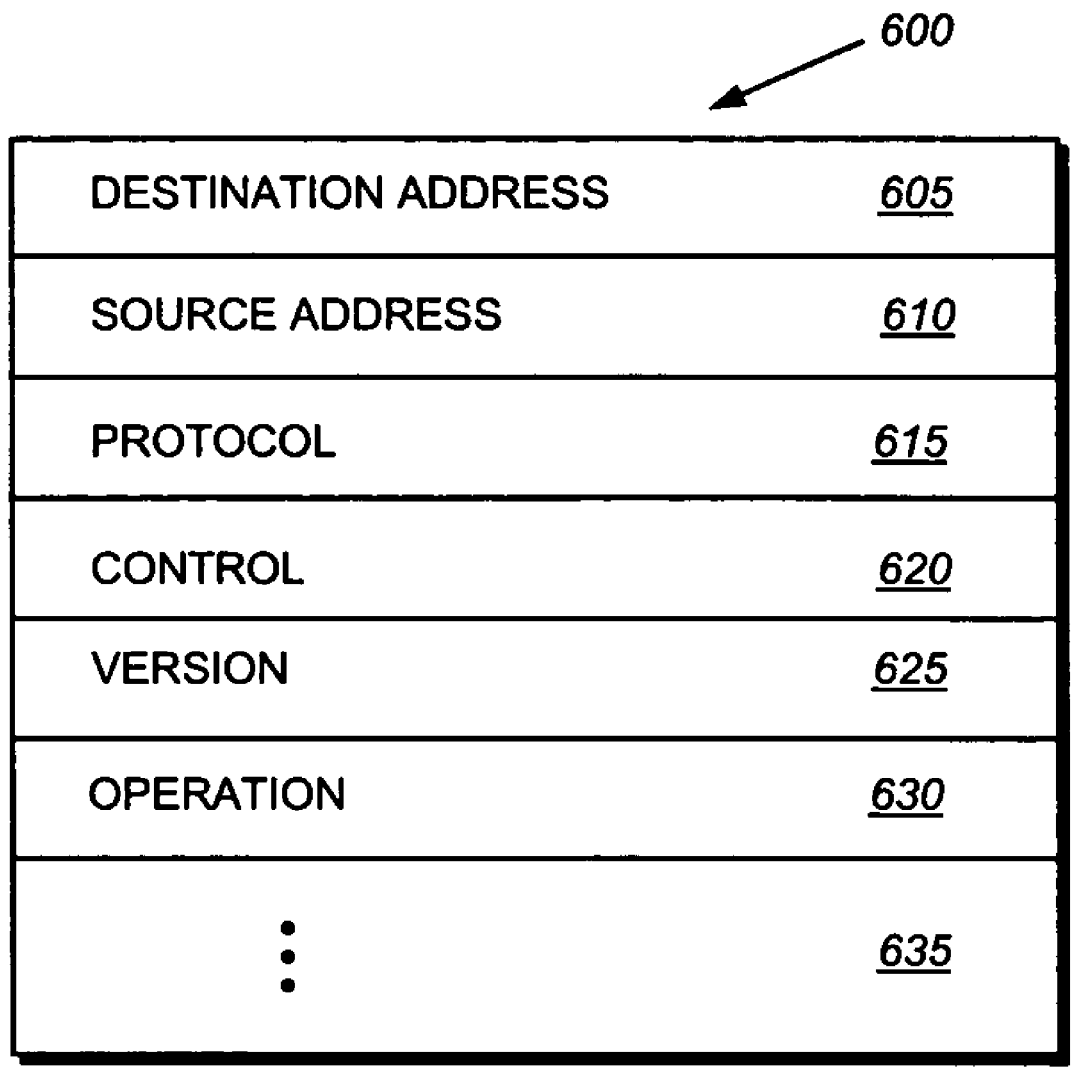
FIG. 6 is a schematic block diagram of a MVIA module protocol control packet in accordance with an embodiment of the present invention.

FIG. 6 is schematic block diagram of an exemplary control packet 600 in accordance with an illustrative embodiment of the present invention. The control packet 600 includes a destination address field 605, a source address field 610, a protocol field 615, a control field 620, a version field 625, an operation field 630 and, in alternate embodiments, additional fields 635. The destination address, source address, protocol, control and version fields 605-625 are identical to their respective fields described above with reference to data packet 400. Note that a value may be set within the control field 620 identifying the packet as a control packet. The operation field 630 stores a value identifying the VI protocol operation to be performed. The operation may comprise any of the conventional operations described within the VI architecture.

As noted above, the MVIA module 373 of the storage operating system 300 generates the appropriate data, control and acknowledgment packets to be sent over the cluster interconnect in accordance with the illustrative embodiment of the present invention. The MVIA module similarly decodes the received packets and implements the desired commands by interfacing with other modules of the storage operating system.

In accordance with the illustrative embodiment of the present invention, two instantiations of a storage operating system simulator execute on a host computer to simulate a cluster environment. The storage operating system simulator includes portions of a storage operating system, such as a media access layer of network drivers, as well as other layers of an interconnect communications stack. According to the invention, the storage operating system simulator is modified by utilizing an emulated VI protocol adapter (MVIA)

module that provides a plugable communication architecture between the instantiations of the simulator. The plugable communication architecture is configured to operate with a plurality of interprocess data pathway mechanisms to thereby emulate a network connection such as a cluster interconnect over Ethernet, or any other transport medium that is supported by a MVIA module. In a first embodiment, the interprocess data pathway mechanisms are ring buffers of a shared memory region associated with the media access drivers of the storage operating system's communication stack. In a second embodiment, the communication mechanism is a socket pair between the two simulator processes by the media access layers of the respective simulator instantiations.

F. Storage Operating System Simulator

In accordance with the embodiment of the present invention, the storage operating system 300 is executed as a user-level application (a storage operating system simulator) on a host computer for testing purposes. The disk driver module 350 of the storage operating system interfaces with a file system of the host computer so that a file is utilized to represent a disk associated with the storage operating system. Similarly, the media access layer 310 of the storage operating system interfaces with the host's media access layer so that, for example, data access commands may be received by the host computer over a protocol such as TCP/IP, and passed to the media access layer 310 of the simulated storage operating system.

In accordance with the present invention, the media layer 310 is also interconnected with a novel interprocess data pathway that connects two or more storage operating system simulators executing on a host computer. In the first embodiment of the present invention, the interprocess data pathway may comprise ring buffers of a shared memory region between two or more instantiations of the simulated storage operating system. Alternately, the interprocess data pathway may comprise a socket, as defined by Request for Comments (RFC) 147, or other conventional interprocess communication link, among instantiations of the simulated storage operating system. Thus, in the illustrative embodiment, the interconnect communication stack, comprising the virtual VI NIC 365, the interconnect bulk layer 367 and the MVIA layer 373 may be tested as data flows through the interconnect communication stack before passing to the interprocess data pathway.

Figure 7:
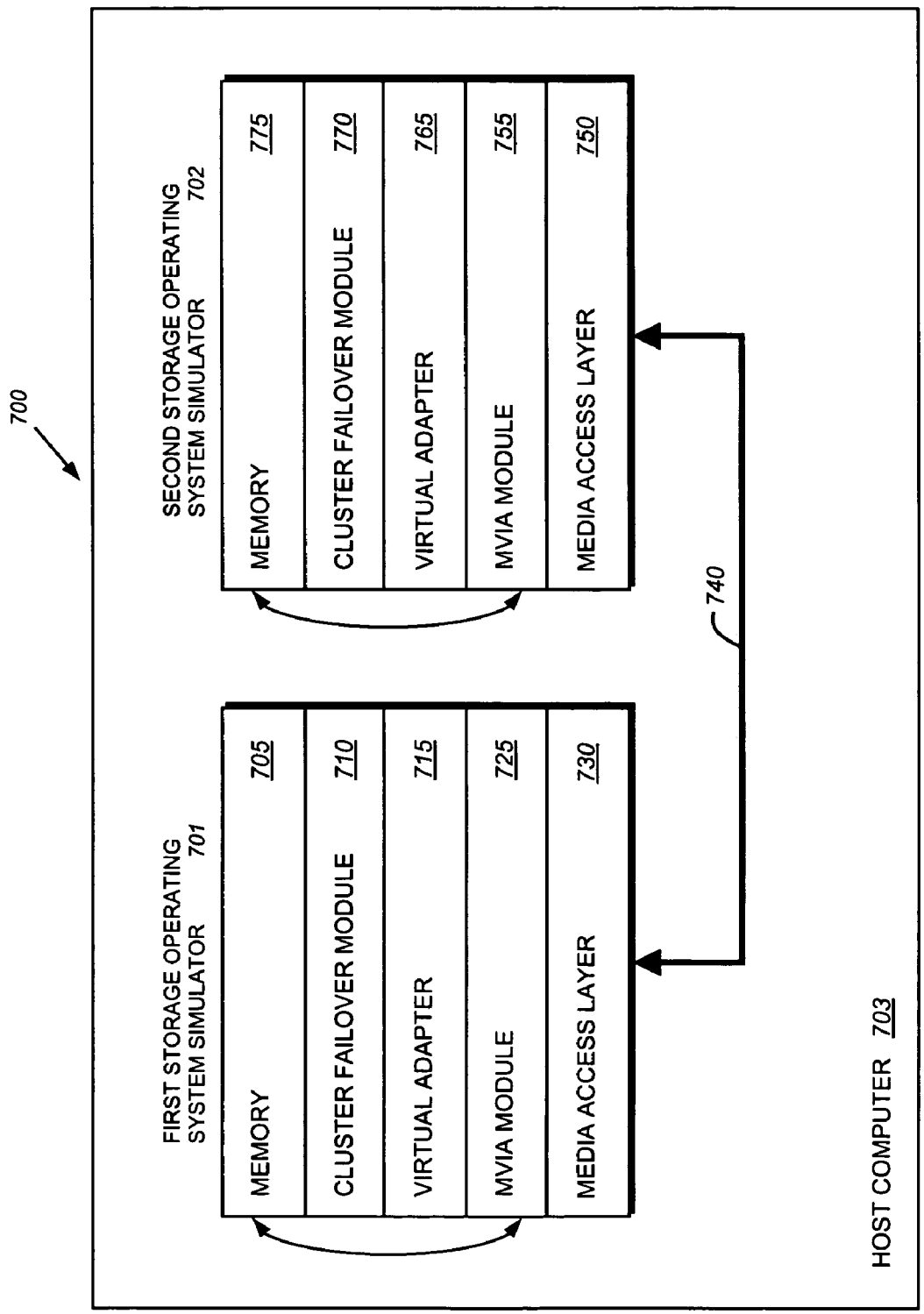
FIG. 7 is a schematic block diagram of exemplary software protocol emulation stacks in accordance with an embodiment of the present invention.

FIG. 7 is a schematic block diagram of various storage operating system simulator modules utilized in first and second storage operating system simulators in accordance with an illustrative embodiment of the present invention. The storage operating system simulators 701, 702 execute within a host computer 703, such as a workstation or PC. The modules utilized in an illustrative RDMA write operation are shown. However, it should be noted that the principles of the present invention apply to any RDMA command sent over an interprocess data pathway. The data to be transferred originates in a memory 705 associated with a first storage operating system simulator 701. A cluster failover module 710 passes a desired command, including appropriate address locations and links to the MVIA module 725, which generates the appropriate protocol (i.e., Ethernet) packets to send over the physical cluster interconnect transport medium 110. The MVIA module 725 sends the generated packets to the media access layer 730 which passes them to the interprocess data pathway 740. As noted above, the interprocess data pathway may comprise a shared memory space that is adapted to store Ethernet ring buffers. Alternately, the interprocess data pathway may comprise socket-to-socket communication, wherein each socket is identified with a process running on a storage operating system simulator.

The interprocess data pathway 704 passes the received packets to a media access module 750 of the second storage operating system simulator. The received packets are then passed to the MVIA module 755 of the second storage operating system simulator for processing. Depending on the command received, i.e. a read or write operation, the MVIA module 755 may directly access the memory 775 of the second storage appliance. For example, if the MVIA module 755 receives an RDMA read request, the MVIA module may directly access the memory 775 to obtain the desired information to be transmitted over the data pathway 740. Alternately, the received command is passed from the MVIA module 755 to the virtual VI NIC 765 of the second storage appliance. The virtual VI NIC 765 permits a unified interface to high-level modules of the storage operating system simulator including, for example, the cluster failover module 771.

Alternately, in the case of a cluster configuration of storage operating system simulators that is utilizing data access operation proxying techniques, such as described in U.S. patent application Ser. No. 10/811,095 entitled SYSTEM AND METHOD FOR PROXYING DATA ACCESS COMMANDS IN A CLUSTER CONFIGURATION, by Herman Lee et al., the cluster failover module 770 may be replaced by another module of the storage operation system, for example, a SCSI target module 334. If, however, the MVIA module 755 receives a special packet, such as a cluster configuration specific kill packet, the module 755 performs the appropriate processing.

In effect, the MVIA module implements a protocol layer that maps an API with RDMA and/or DAT semantics onto a transport medium that lacks RDMA semantics. It should be noted that DAT is a generalized abstraction of RDMA semantics. In the illustrative embodiment, the API is a virtual VI NIC. However, it should be noted that in alternate embodiments, any RDMA or DAT API may be implemented, e.g., Virtual Interface Provider Library (VIPL) or Direct Access Provider Library (DAPL) and variants thereof, such as kVIPL, uDAPL, kDAPL, etc.

To again summarize, the present invention provides a system and method for simulating a software protocol stack using an emulated protocol over an emulated network for testing and/or debugging purposes. A storage operating system that typically executes on a storage appliance is executed as a user-level application (a storage operating system simulator) within a host computer. To simulate a cluster of storage appliance, multiple instantiations of the simulated storage operating system are executed. This simulated network permits an interconnect communication stack, including an MVIA module, to be tested without the need for a physical storage appliance.

The foregoing description has been directed to particular embodiments of this invention. It will be apparent, however, that other variations and modifications may be made to the described embodiments, with the attainment of some or all of their advantages. It should be noted that alternative protocols, such as InfiniBand, or any other appropriate protocol may be employed using the teachings of the present invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system for simulating software protocol stacks, the system comprising:
a host computer executing a host operating system and a plurality of storage operating system simulators, each storage operating system simulator including a software protocol stack; and
an interprocess data pathway interconnecting the software protocol stacks, whereby the software protocol stacks are utilized in performing input/output operations over the data pathway.

2. The system of claim 1 wherein the software protocol stack comprises an interconnect communication stack.

3. The system of claim 2 wherein the interconnect communication stack comprises:
an interconnect bulk module adapted to provide flow control over the interprocess pathway; and
an emulated protocol module adapted to emulate a protocol that supports remote direct memory access operations over a protocol that does not natively support remote direct memory access operations.

4. The system of claim 3 wherein the protocol that supports remote direct memory access operations comprises a virtual interface protocol.

5. The system of claim 3 wherein the protocol that does not natively support remote direct memory access operations comprises an Ethernet protocol.

6. The system of claim 1 wherein the interprocess data pathway comprises a shared memory space of ring buffers.

7. The system of claim 1 wherein the interprocess data pathway comprises a socket pair between the software protocol stacks.

8. A system for simulating software protocol stacks, the system comprising:
means for executing a plurality of storage operating system simulators, each of the storage operating system simulators including a software protocol stack; and
means for interconnecting the software protocol stacks, whereby the software protocol stacks are utilized in performing input/output operations over the means for interconnecting the software protocol stacks.

9. The system of claim 8 wherein the software protocol stack comprises an interconnect communication stack.

10. The system of claim 9 wherein the interconnect communication stack comprises:
means for providing flow control over the data pathway; and
means for emulating a protocol that supports remote direct memory access operations over a protocol that does not natively support remote direct memory access operations.

11. The system of claim 9 wherein the protocol that supports remote direct memory access operations comprises a virtual interface protocol.

12. The system of claim 9 wherein the protocol that does not natively support remote direct memory access operations comprises an Ethernet protocol.

13. The system of claim 8 wherein the means for interconnecting the software protocol study comprises a shared memory space of ring buffer.

14. The system of claim 8 wherein the means for interconnecting the software protocol stacks comprises a socket pair between the software protocol stacks.

15. A method comprising:
executing, on a host computer having a host operating system, two or more storage operating system simulators, each having a software protocol stack; and
interconnecting the software protocol stacks by an interprocess data pathway, whereby the software protocol stacks are utilized in performing input/output operations over the data pathway.

16. The method of claim 15 further comprising:
generating a packet in a first protocol stack of the software protocol stacks;
transferring the packet over the interprocess data pathway to a second protocol stack of the software protocol stacks; and
processing the packet in the second protocol stack.

17. The method of claim 16 further comprising: executing a cluster failover module to generate the packet.

18. The method of claim 16 further comprising: executing a Small Computer Systems Interface (SCSI) target module to generate the packet.

19. The method of claim 16 further comprising: executing an emulated Virtual Interface protocol adaptor (MVIA) module to transfer the packet.

20. The method of claim 16 wherein the packet has a command, the method further comprising: determining whether the command is either a read command or a write command.

21. The method of claim 20 further comprising: directly accessing a memory of the second protocol stack with a command when the command is a read command.

22. The method of claim 20 further comprising:
passing the command through an emulated Virtual Interface protocol adaptor (MVIA) when the command is a write command, the MVIA configured to implement a protocol layer that maps an API with appropriate semantics onto a transport medium that lacks the appropriate semantics; and
accessing a memory interfaced to the MVIA with the command.

23. The method of claim 22 wherein the API is a Small Computer System Interface (SCSI) target module.

24. The method of claim 15 further comprising: performing testing of the storage operating system.

25. The method of claim 15 further comprising: performing debugging of the storage operating system.

* * * * *